US011651015B2

(12) United States Patent
Fan et al.

(10) Patent No.: US 11,651,015 B2
(45) Date of Patent: May 16, 2023

(54) METHOD AND APPARATUS FOR PRESENTING INFORMATION (71) Applicant: Baidu Online Network Technology (Beijing) Co., Ltd., Beijing (CN)

(72) Inventors: Miao Fan, Beijing (CN); Lin Guo, Beijing (CN); Chao Feng, Beijing (CN); Mingming Sun, Beijing (CN); Ping Li, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 788 days.

(21) Appl. No.: 16/670,814

(22) Filed: Oct. 31, 2019

(65) Prior Publication Data
US 2020/0218746 A1 Jul. 9, 2020

(30) Foreign Application Priority Data

Jan. 8, 2019 (CN) .......................... 201910019968.1

(51) Int. Cl.
*G06F 16/30* (2019.01)
*G06F 16/338* (2019.01)
(Continued)

(52) U.S. Cl.
CPC ........ *G06F 16/338* (2019.01); *G06F 16/3347* (2019.01); *G06N 3/0445* (2013.01);
(Continued)

(58) Field of Classification Search
CPC . G06F 16/338; G06F 16/3347; G06N 3/0445; G06N 3/0454; G06N 3/0472; G06N 3/084
See application file for complete search history.

(56) References Cited

U.S. PATENT DOCUMENTS 7,519,562 B1 * 4/2009 Vander Mey .......... G06Q 99/00
705/500
8,001,003 B1 * 8/2011 Robinson ........... G06Q 30/0201
705/7.29
(Continued)

FOREIGN PATENT DOCUMENTS

| CN | 107657056 A | 2/2018 |
| CN | 108363790 A | 8/2018 |
| CN | 108920665 A | 11/2018 |

OTHER PUBLICATIONS

Article entitled "Designing Novel Review Ranking Systems: Predicting the Usefulness and Impact of Reviews", by Ghose et al., dated Aug. 22, 2007 (Year: 2007).*

(Continued)

*Primary Examiner* — Mahesh H Dwivedi
(74) *Attorney, Agent, or Firm* — Knobbe, Martens, Olson & Bear, LLP (57) ABSTRACT Embodiments of the present disclosure provide a method and apparatus for presenting information. The method may include: acquiring target release information and a comment information set associated with the target release information; and generating, for comment information in the comment information set, usefulness probabilities and predicted comment scores of the comment information based on the comment information and the target release information. The method may further include: presenting, based on obtained usefulness probability set and predicted comment score set, the comment information in the comment information set.

9 Claims, 6 Drawing Sheets (51) Int. Cl.
*G06F 16/33* (2019.01)
*G06N 3/04* (2023.01)
*G06N 3/084* (2023.01)

(52) U.S. Cl.
CPC ......... *G06N 3/0454* (2013.01); *G06N 3/0472* (2013.01); *G06N 3/084* (2013.01)

(56) References Cited

U.S. PATENT DOCUMENTS

| | | | |
|---|---|---|---|
| 2008/0071602 A1* | 3/2008 | Ojakaar | G06Q 30/0603 705/306 |
| 2013/0218884 A1 | 8/2013 | McConnell et al. | |
| 2017/0139919 A1 | 5/2017 | Ball et al. | |
| 2017/0139921 A1 | 5/2017 | Ball et al. | |
| 2017/0140051 A1 | 5/2017 | Ball et al. | |

OTHER PUBLICATIONS

Article entitled "How to See the Filtered Reviews on Yelp", by Washam, dated Jun. 7, 2015 (Year: 2015).*
Article entitled "Amazon Product Reviews Helpfulness Prediction", by Li, dated Apr. 2017. (Year: 2017).*
Article entitled "Gated Word-Character Recurrent Language Model", by Miyamoto et al., dated Oct. 13, 2016 (Year: 2016).*
Article entitled "From Helpfulness Prediction to Helpful Review Retrieval for Online Product Reviews", by Vo et al., dated Dec. 7, 2018 (Year: 2018).*
Article entitled "Identification of Useful User Comments in Social Media: A Case Study on Flickr Commons", by Momeni et al., dated Jul. 26, 2013 (Year: 2013).*
Article entitled "Predicting Usefulness of Yelp Reviews with Localized Linear Regression Models", by Shen et al., dated 2016. (Year: 2016).*

* cited by examiner

METHOD AND APPARATUS FOR PRESENTING INFORMATION

CROSS-REFERENCE TO RELATED APPLICATION

This application claims priority to Chinese Patent Application No. 201910019968.1, filed on Jan. 8, 2019, titled "Method and apparatus for presenting information," which is hereby incorporated by reference in its entirety.

TECHNICAL FIELD

Embodiments of the present disclosure relate to the field of computer technology, specifically to the field of Internet technology, and more particularly to a method and apparatus for presenting information.

BACKGROUND

The Internet has entered a new era in which the identity of a web user has changed from a simple viewer to a complex of a viewer and a content producer. That is, the user may release his own opinion on the web in the form of "post" while browsing text information. Such a commenting mechanism has been maturely applied in service products such as news applications, post bar applications, and shopping applications. These products release tens of thousands of pieces of text information (news information, product description information, etc.) every day, and users release mass comment information on the basis of the text information.

Because comments are usually generated by users, not all comments can provide other users with useful or valuable information related to commented objects, and even some comments may be completely unrelated to the commented objects. Some comments may be released for improper purposes, and have high quality, but are unrelated to the released text topics. If a commented object is commented too much and useful comments are mixed with useless comments, other users have difficulty in quickly acquiring useful information from numerous comments, and the useless information is not beneficial to correct evaluation on the commented object by a provider or other third party (e.g., whether it is worthy of recommendation). Therefore, the value or usefulness of comments needs to be evaluated.

SUMMARY

Embodiments of the present disclosure provide a method and apparatus for presenting information.

In a first aspect, an embodiment of the present disclosure provides a method for presenting information, including: acquiring target release information and a comment information set associated with the target release information; generating, for comment information in the comment information set, usefulness probabilities and predicted comment scores of the comment information based on the comment information and the target release information; and presenting, based on obtained usefulness probability set and predicted comment score set, the comment information in the comment information set.

In some embodiments, the presenting, based on the obtained usefulness probability set and predicted comment score set, the comment information in the comment information set includes: presenting the comment information in the comment information set in a descending order of corresponding predicted comment scores.

In some embodiments, the presenting, based on the obtained usefulness probability set and predicted comment score set, the comment information in the comment information set includes: displaying the comment information corresponding to usefulness probabilities smaller than a preset threshold by hiding or folding.

In some embodiments, the generating usefulness probabilities and predicted comment scores of the comment information based on the comment information and the target release information includes: extracting word vector codes and character vector codes from the comment information, and generating initial comment codes based on the word vector codes extracted from the comment information and the character vector codes extracted from the comment information; extracting word vector codes and character vector codes from the target release information, and generating initial release codes based on the word vector codes extracted from the target release information and the character vector codes extracted from the target release information; and generating the usefulness probabilities and the predicted comment scores based on the initial comment codes and the initial release codes.

In some embodiments, the generating usefulness probabilities and predicted comment scores based on the initial comment codes and the initial release codes includes: inputting the initial comment codes into a first bidirectional long and short-term memory recurrent neural network to obtain comment codes; inputting the initial release codes into a second bidirectional long and short-term memory recurrent neural network to obtain release codes; converting the release codes by an attention weight matrix to obtain release mapping codes; generating attention mechanism codes based on the release mapping codes and the comment codes; inputting the attention mechanism codes into a logistic regression model to obtain usefulness probabilities; and inputting the attention mechanism codes into a linear regression model to obtain predicted comment scores.

In a second aspect, an embodiment of the present disclosure provides an apparatus for presenting information, including: an acquisition unit, configured to acquire target release information and a comment information set associated with the target release information; a generation unit, configured to generate, for comment information in the comment information set, usefulness probabilities and predicted comment scores of the comment information based on the comment information and the target release information; and a presenting unit, configured to present, based on the obtained usefulness probability set and predicted comment score set, the comment information in the comment information set.

In some embodiments, the presenting unit is further configured to present the comment information in the comment information set in a descending order of corresponding predicted comment scores.

In some embodiments, the presenting unit is further configured to display the comment information corresponding to usefulness probabilities smaller than a preset threshold by hiding or folding.

In some embodiments, the generation unit includes: a first generation subunit, configured to extract word vector codes and character vector codes from the comment information, and generate initial comment codes based on the word vector codes extracted from the comment information and the character vector codes extracted from the comment information; a second generation subunit, configured to extract word vector codes and character vector codes from the target release information, and generate initial release codes based on the word vector codes extracted from the target release information and the character vector codes extracted from the target release information; and a third generation subunit, configured to generate the usefulness probabilities and the predicted comment scores based on the initial comment codes and the initial release codes.

In some embodiments, the third generation subunit includes: a first input module, configured to input the initial comment codes into a first bidirectional long and short-term memory recurrent neural network to obtain comment codes; a second input module, configured to input the initial release codes into a second bidirectional long and short-term memory recurrent neural network to obtain release codes; a conversion module, configured to convert the release codes by an attention weight matrix to obtain release mapping codes; a generation module, configured to generate attention mechanism codes based on the release mapping codes and the comment codes; a third input module, configured to input the attention mechanism codes into a logistic regression model to obtain usefulness probabilities; and a fourth input module, configured to input the attention mechanism codes into a linear regression model to obtain predicted comment scores.

In a third aspect, an embodiment of the present disclosure provides an electronic device, including: one or more processors; and a storage apparatus, configured to store one or more programs, where the one or more programs, when executed by the one or more processors, cause the one or more processors to implement the method described in the first aspect.

In a fourth aspect, an embodiment of the present disclosure provides a computer readable storage medium storing a computer program, where the computer program, when executed by a processor, causes the processor to implement the method described in the first aspect.

According to the method and apparatus provided by some embodiments of the present disclosure, target release information and a comment information set associated with the target release information are acquired first. Then, for comment information in the comment information set, usefulness probabilities and predicted comment scores of the comment information are generated based on the comment information and the target release information. Finally, the comment information in the comment information set is presented based on the obtained usefulness probability set and predicted comment score set. Therefore, the comment information having high quality and related to the target release information may be presented to meet user needs and improve user experience.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
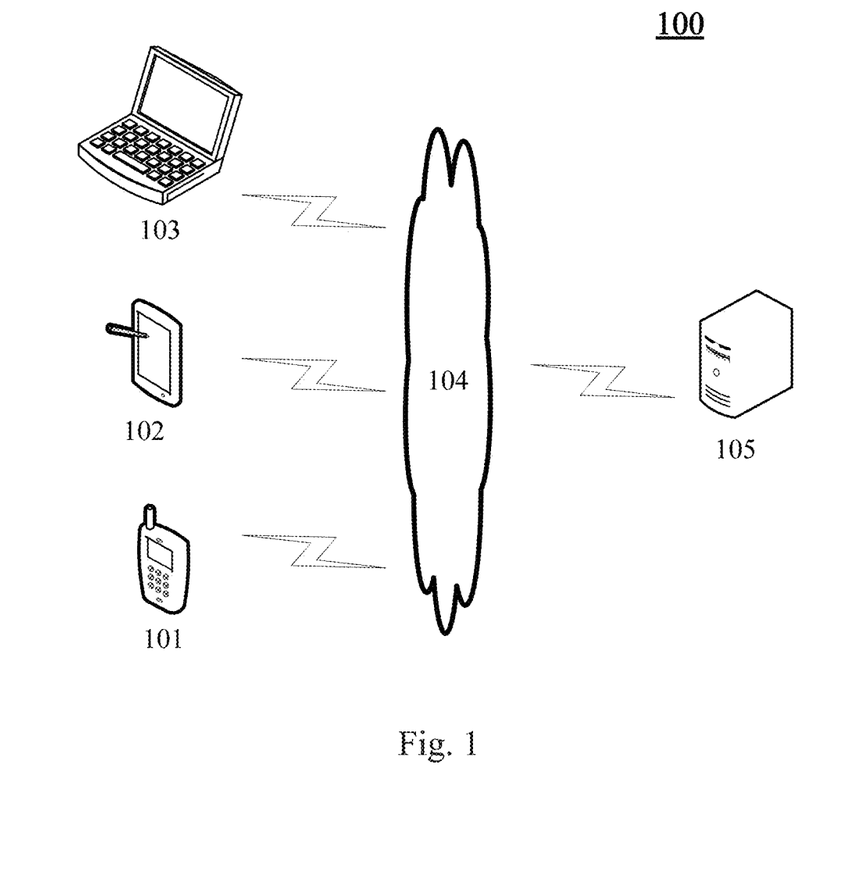
FIG. 1 is an architectural diagram of an example system in which some embodiments of the present disclosure may be applied.

FIG. 1 shows an example system architecture 100 in which a method for presenting information or an apparatus for presenting information according to some embodiments of the present disclosure may be applied.

As shown in FIG. 1, the system architecture 100 may include terminal devices 101, 102 and 103, a network 104, and a server 105. The network 104 serves as a medium providing a communication link between the terminal devices 101, 102 and 103 and the server 105. The network 104 may include various types of connections, such as wired or wireless communication links, or optical fiber cables.

The terminal devices 101, 102 and 103 may be hardware or software. When the terminal devices 101, 102 and 103 are hardware, the terminal devices may be various electronic devices having a display screen and supporting information input, including but not limited to a smart phone, a tablet computer, an e-book reader, a laptop portable computer, a desktop computer, or the like. When the terminal devices 101, 102 and 103 are software, the terminal devices may be installed in the above-listed electronic devices. The terminal devices may be implemented as a plurality of software programs or software modules (e.g., software programs or software modules for providing distributed services), or as a single software program or software module, which is not specifically limited in the present disclosure.

The server 105 may be a server providing various services, for example, an evaluation server capable of evaluating the quality of comments for users using the terminal devices 101, 102 and 103. The evaluation server may evaluate the received data such as user comments and feed processing results (e.g., usefulness probabilities and predicted comment scores determined by evaluation) back to the terminal devices.

It should be noted that the method for presenting information according to some embodiments of the present disclosure may be performed by the terminal device 101, 102 or 103, or by the server 105. Accordingly, the apparatus for presenting information may be provided in the terminal device 101, 102 or 103, or in the server 105, which is not specifically limited in the present disclosure.

It should be understood that the numbers of the terminal devices 101, 102 and 103, the network 104, and the server 105 in FIG. 1 are merely illustrative. Any number of terminal devices, networks, and servers may be provided based on actual requirements.

Figure 2:
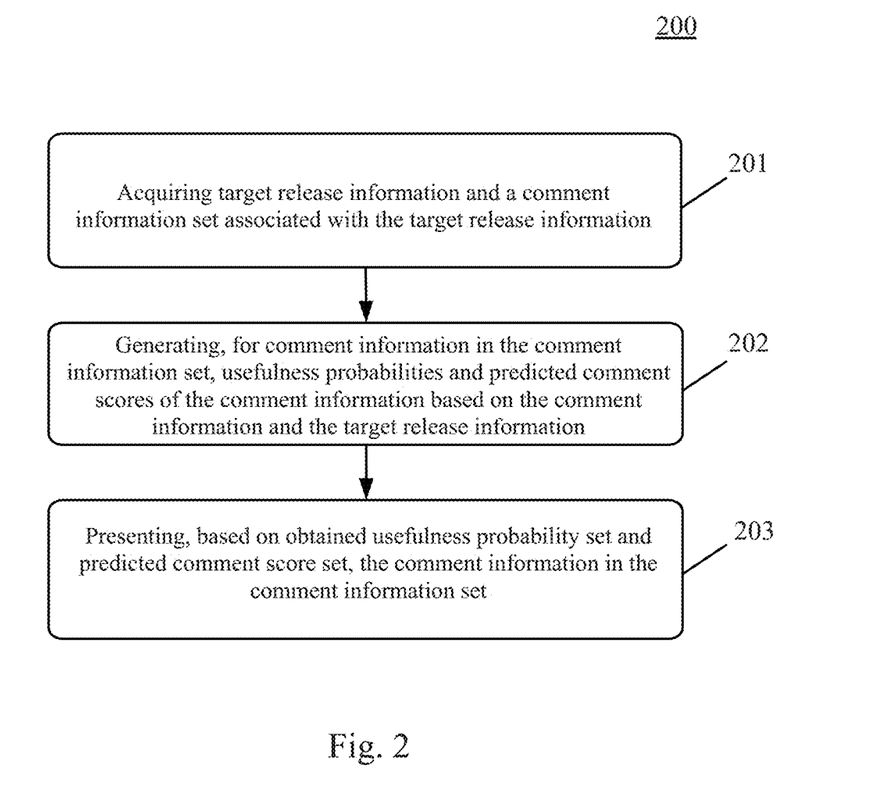
FIG. 2 is a flowchart of a method for presenting information according to an embodiment of the present disclosure.

Further, referring to FIG. 2, a flow 200 of a method for presenting information according to an embodiment of the present disclosure is shown. The method for presenting information includes the following steps.

Step 201: acquiring target release information and a comment information set associated with the target release information.

In the present embodiment, the executing body (for example, the server 105 shown in FIG. 1) of the method for presenting information may acquire the target release information and the comment information set associated with the target release information in various ways. For example, the executing body may acquire target release information stored in a database server (not shown) from the database server through a wired or wireless connection. For another example, the executing body may also receive target release information acquired by a terminal (e.g., the terminal 101, 102 or 103 shown in FIG. 1) or other device.

It should be noted that the target release information and the comment information set associated with the target release information may be directly stored locally or stored in other electronic device in communication connection with the executing body. When the target release information and the comment information set associated with the target release information are stored locally, the executing body may directly extract the locally stored target release information and comment information set associated with the target release information for processing. When the target release information and the comment information set associated with the target release information are stored in other electronic device in communication connection with the executing body, the executing body may acquire the target release information and the comment information set associated with the target release information through a wired or wireless connection for processing.

Here, the target release information generally refers to information released in an application, and the application may be a shopping application, a post bar application, or a question and answer application, etc. For example, the target release information may be a title of a post in a post bar, or description of a commodity in a shopping application.

The comment information may also be referred to as comments, messages, replies, etc., and refers to contents (e.g., opinions, suggestions, reviews, viewpoints, etc.) related to an object or a certain type of objects. Here, the object may be a physical object or a virtual object, such as a product, a service, a specific form of content (e.g., news, video, short text, etc.). The comment information is usually written by corresponding reviewers and submitted to a specific web host. In the present embodiment, the comment information may be expressed as text. Alternatively, the comment information may also be expressed as audio, video, pictures, etc.

Here, the comment information associated with the target release information generally refers to comment information corresponding to the target release information, for example, commodity comment information corresponding to the description of the commodity, or reply information about the title of the post in the post bar.

Step 202: generating, for comment information in the comment information set, usefulness probabilities and predicted comment scores of the comment information based on the comment information and the target release information.

Here, the usefulness probabilities may be used to characterize the degree of usefulness of the comment information. The predicted comment scores are used to characterize predicted scores of the comment information, and the scores generally refer to other users' scores on the comment information.

Specifically, different levels of features, such as structural features, lexical features, part-of-speech features, and semantic features, may be extracted from the comment information and the target release information, and then the values of comments are predicted using a common classification model or regression model, for example, a support vector machine, a random forest, etc.

Alternatively, the usefulness probabilities and predicted comment scores of the comment information may also be generated by inputting the comment information and the target release information into an information evaluation model, where the information evaluation model is used to characterize corresponding relationships between the two of the comment information and target release information, and the two of the usefulness probabilities and predicted comment scores. The information evaluation model may be a pre-stored corresponding relationship table. Corresponding relationships between multiple pieces of comment information and release information, and usefulness probabilities and predicted comment scores may be stored in the corresponding relationship table. The corresponding relationship table may be developed by a technician based on statistics on a large amount of comment information and release information, usefulness probabilities and predicted comment scores. The executing body may compare the comment information and the target release information with the comment information and the release information in the corresponding relationship table. If a piece of comment information and a piece of release information in the corresponding relationship table are the same as or similar to the comment information and the target release information, the usefulness probability and predicted comment score corresponding to the comment information and release information in the corresponding relationship table are used as a usefulness probability and a predicted comment score of the comment information and the target release information.

Alternatively, the information evaluation model may also be various existing neural network models created and trained based on machine learning technology. The neural network models may have various existing neural network structures (e.g., convolutional neural networks, recurrent neural networks). The storage location of the information evaluation model is also not limited in the present disclosure.

Step 203: presenting, based on the obtained usefulness probability set and predicted comment score set, the comment information in the comment information set.

In some alternative implementations, the comment information in the comment information set is presented in a descending order of corresponding predicted comment scores.

In some alternative implementations, the comment information corresponding to usefulness probabilities smaller than a preset threshold is displayed by hiding or folding.

In these alternative implementations, the hidden display generally refers to not displaying, that is, not displaying the comment information corresponding to the usefulness probabilities smaller than the preset threshold. The folded display generally refers to folding the comment information by a specified tag or folding the comment information and giving a prompt "The comment information has been folded". For example, the folded display is applied to a navigation template, a discussion page or the like with many items, where some layouts may be expanded and contracted by clicks of a mouse to facilitate reader's navigation reading.

In the present embodiment, the user generally desires to evaluate, understand, or recognize one or more aspects (e.g., quality, characteristics, function, advantages and disadvantages, details) of a particular object from the comments given by the reviewers. If the comments contain information about these aspects, the user tends to think that the comments are valuable or useful. Otherwise, the comments are considered worthless or useless.

According to the method for presenting information provided by the present embodiment, target release information and a comment information set associated with the target release information are acquired first, then usefulness probabilities and predicted comment scores of comment information are generated for the comment information in the comment information set based on the comment information and the target release information, and finally, the comment information in the comment information set is presented based on the obtained usefulness probability set and predicted comment score set. Therefore, more valuable comment information is presented for a user to meet user needs and enhance user experience.

Figure 3:
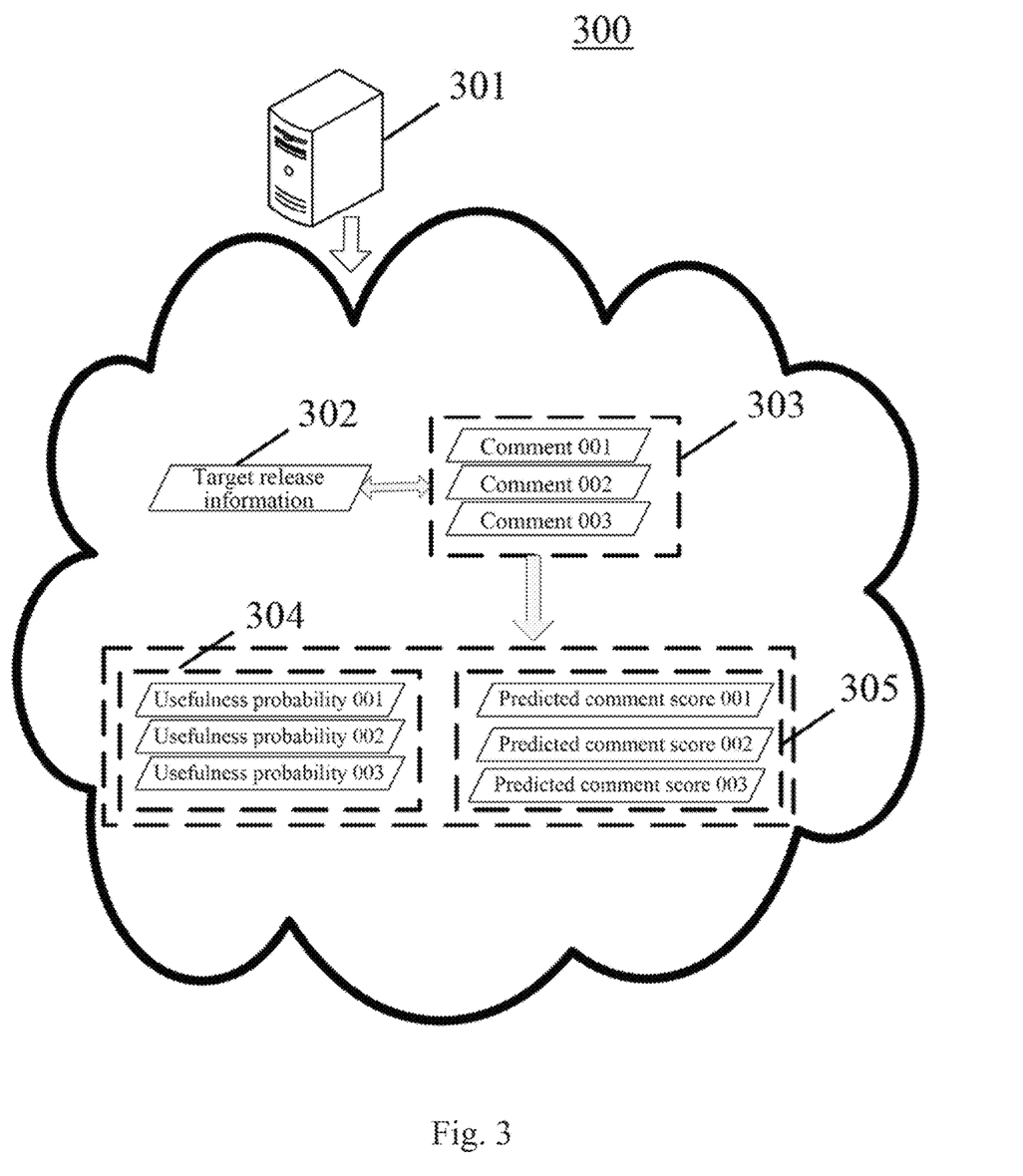
FIG. 3 is a flowchart of an application scenario of the method for presenting information according to an embodiment of the present disclosure.

With further reference to FIG. 3, FIG. 3 is a schematic diagram 300 of an application scenario for presenting comment information in a comment information set based on the obtained usefulness probability set and predicted comment score set according to the present embodiment.

In the application scenario shown in FIG. 3, a server 301 acquires target release information 302 and a comment information set 303 associated with the target release information. For comment information in the comment information set 303, usefulness probabilities and predicted comment scores of the comment information are generated based on the comment information and the target release information 302. The comment information in the comment information set is presented based on the obtained usefulness probability set 304 and predicted comment score set 305. Specifically, the comment information in the comment information set is presented in a descending order of the predicted comment scores, and the comment information having the usefulness probabilities less than 0.5 is displayed by folding.

According to the method for presenting information in the present embodiment, target release information and a comment information set associated with the target release information are acquired first. Then, for comment information in the comment information set, usefulness probabilities and predicted comment scores of the comment information are generated based on the comment information and the target release information. Finally, the comment information in the comment information set is presented based on the obtained usefulness probability set and predicted comment score set. Therefore, the comment information having high quality and related to the target release information may be presented. The comment information in the comment information set is presented in a descending order of the predicted comment scores, and the user may preferentially browse the comments with higher predicted comment scores, which helps to improve the user experience. For the folded display of the comment information having the usefulness probabilities smaller than the preset threshold, the user does not need to browse the comments with lower values (lower usefulness probabilities), which helps to further improve the user experience.

Figure 4:
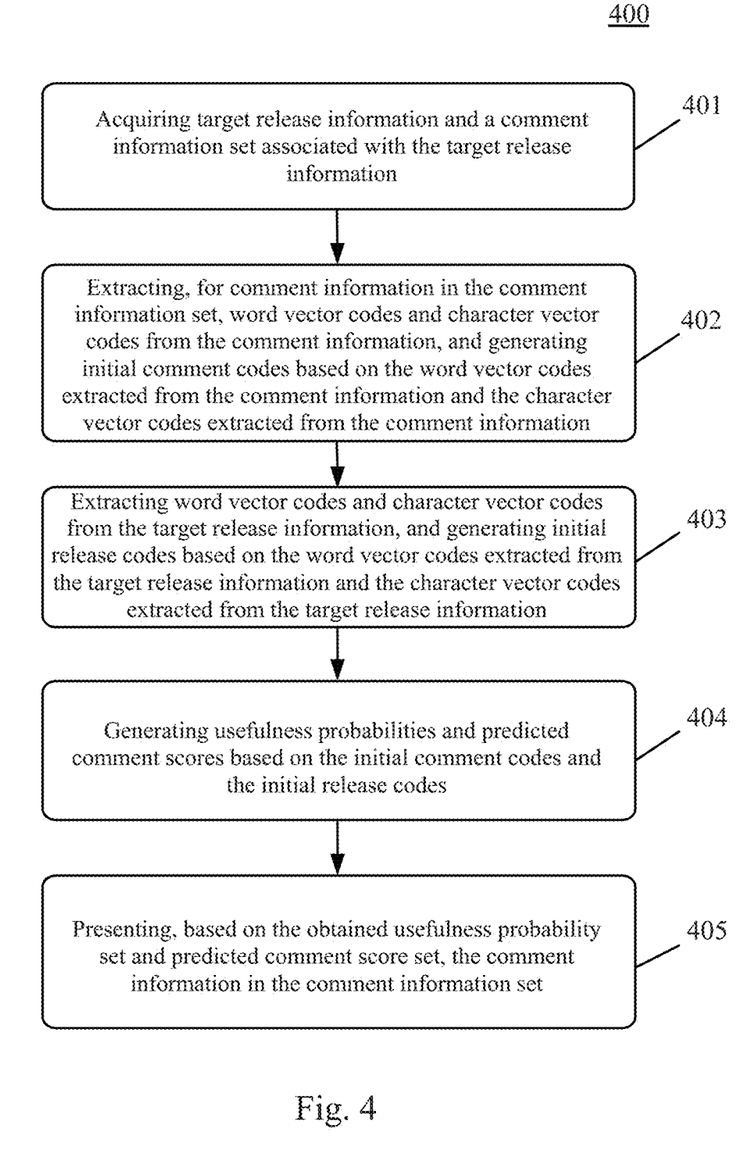
FIG. 4 is a flowchart of the method for presenting information according to another embodiment of the present disclosure.

With further reference to FIG. 4, a flow 400 of a method for presenting information according to another embodiment is shown. The flow 400 of the method for presenting information includes the following steps.

Step 401: acquiring target release information and a comment information set associated with the target release information.

Step 402: extracting, for comment information in the comment information set, word vector codes and character vector codes from the comment information, and generating initial comment codes based on the word vector codes extracted from the comment information and the character vector codes extracted from the comment information.

In the present embodiment, the process of extracting the word vector codes is as follows: the division granularity of the comment information may be related to a language used by the text of comments. For example, if the comment information contains words composed of Latin Pinyin such as English, French, and German, the comments may be divided by word level to obtain word vector codes. If the comments contain pictographs such as Chinese and Japanese, the comments may be divided by phrase level (or vocabulary level). The words are converted into vectors of a specified dimension (word vector codes). Dimension conversion of vectors is a well-known technique, and details are not described herein.

In the present embodiment, the process of extracting character vector codes is as follows: each word may be further divided to obtain characters of finer granularity. For example, for English comments, after a plurality of words is obtained by word-level granularity division, the words may be further divided by character-level granularity to obtain one or more characters (for example, letters) constituting each word. In another example, for comments in Chinese, Japanese and the like, after multiple pieces of vocabulary are obtained by vocabulary-level granularity division, the vocabulary may be further divided by individual character-level granularity to obtain individual characters (for example, Chinese characters or Japanese characters). At this point, each single character represents a character. The characters are converted into vectors of a specified dimension (character vector codes). Dimension conversion of vectors is a well-known technique, and details are not described herein.

Each word may be divided into a different number of characters (e.g., one or more characters). The characters are converted into character vector codes of the same dimension. On this basis, the word vector codes and the character vector codes may be combined to obtain combined vectors (initial comment codes) of the same dimension.

As an example, a comment is assumed to contain n English words (or Chinese vocabulary). If the English word (Chinese vocabulary) at the i index position is defined as $v_i$, this comment as a sequence of length n may be expressed as $v_{1:n}=[v_1, v_2, \ldots, v_n]$. According to this convention, $v_{i:j}$ represents a continuous subsequence $v_{i:j}=[v_i, \ldots, v_j]$ of length j. The "word-level code" corresponding to the English word is defined as a vector of dimension d, that is, $v_i \in \mathfrak{R}^d$ (the lower-case bold represents a vector, the upper-case bold represents a matrix, and $\mathfrak{R}$ represents a real number field). If the number of all different English words is $|V|$, the matrix constituted by these word-level codes is $V \in \mathfrak{R}^{d \times |V|}$, where the vector of $v_i$ is mapped from V. $v_i^p$ is now defined as the $i^{th}$ word in the description of a commodity P, and $v_i^r$ is the $i^{th}$ word of a comment R on the commodity.

Each English word is regarded as a character string, for example, the word "This" includes characters T, h, i, s. The word $v_i$ is assumed to contain n consecutive characters, recorded as $u_{l:n}=[u_1, u_2, \ldots, u_n]$; where $u_j$ represents the $j^{th}$ character of the word $v_i$ (in Chinese, $u_j$ represents the $j^{th}$ Chinese character of the vocabulary $v_i$). The vector of the character $u_j$ is defined as $u_j \in \Re^{d'}$ (i.e., the dimension of the character vector is d'), and $u_{i:j}$ represents one of contiguous subsequences $u_{i:j}=[u_i, \ldots, u_j]$. If the number of all different characters is |U|, the matrix constituted by these character vectors is $U \in \Re^{d' \times |U|}$, where the vector of $u_j$ is mapped from U.

A convolutional neural network is designed to generate vector codes of the same dimension for words of different lengths. A group of convolution filters $W'=[w'_1, w'_2, \ldots, w'_k]$ is used, where each $w'_i \in \Re^{d' \times l'}$ represents a filter capable of convoluting a character sequence of continuous length l', and the information of such a character sequence $u_{j:j+l'-1}$ of continuous length l' may be mapped to a scalar value $p_{i,j}$ by convolution (inner product):

$$p_{i,j}=\tan h(w'_i \cdot u_{j:j+l'-1}+b')$$

Where b' is an offset parameter.

If $u_{l:n}$ is scanned once using $w'_i$, a vector $p_i$ with a dimension n+l'−1 may be obtained. Thus, the feature mapping matrix obtained by convolution is:

$$P=[p_1^T, p_2^T, \ldots, p_K^T]^T$$

Max pooling is performed on each vector $p_i$ in P:

$$h=[\max(p_1^T), \max(p_2^T), \ldots, \max(p_K^T)]^T$$

A character-level code h with a dimension k' may be obtained for the word $v_i$, regardless of the character length n of the word itself.

For any word $v_i$, its complete vector is expressed as $e_i = v_i \oplus h_i$. The initial code of a sentence is expressed as:

$$e_{l:n}=[e_1, e_2, \ldots, e_n]$$

Step 403: extracting word vector codes and character vector codes from the target release information, and generating initial release codes based on the word vector codes extracted from the target release information and the character vector codes extracted from the target release information.

In the present embodiment, step 403 may be performed similar to step 402, and repeated details thereof are not described herein again.

Step 404: generating usefulness probabilities and predicted comment scores based on the initial comment codes and the initial release codes.

In the present embodiment, the initial comment codes may be input into a first recurrent neural network to obtain comment codes. The initial release codes are input into a second recurrent neural network to obtain release codes. The release codes are converted by an attention weight matrix to obtain release mapping codes. Attention mechanism codes are generated based on the release mapping codes and the comment codes. The attention mechanism codes are input into a multi-layer neural network to obtain usefulness probabilities. The attention mechanism codes are input into a linear regression model to obtain predicted comment scores.

Alternatively, the initial comment codes may also be input into a first unidirectional long and short-term memory recurrent neural network to obtain comment codes. Then, the initial release codes are input into a second unidirectional long and short-term memory recurrent neural network to obtain release codes. Later, the release codes are converted by an attention weight matrix to obtain release mapping codes. Next, attention mechanism codes are generated based on the release mapping codes and the comment codes. Then, the attention mechanism codes are input into a logistic regression model to obtain usefulness probabilities. Finally, the attention mechanism codes are input into a linear regression model to obtain predicted comment scores.

In some alternative implementations, the generating usefulness probabilities and predicted comment scores based on the initial comment codes and the initial release codes includes the following steps.

Step 1, the initial comment codes are input into a first bidirectional long and short-term memory recurrent neural network to obtain comment codes.

Step 2, the initial release codes are input into a second bidirectional long and short-term memory recurrent neural network to obtain release codes.

Step 3, the release codes are converted by an attention weight matrix to obtain release mapping codes.

Step 4, attention mechanism codes are generated based on the release mapping codes and the comment codes.

Step 5, the attention mechanism codes are input into a logistic regression model to obtain usefulness probabilities.

Step 6, the attention mechanism codes are input into a linear regression model to obtain predicted comment scores.

Combinations of different consecutive text items may have different importance in the context of the comments, and also make different contributions to the semantic understanding of the comments. The importance may be set based on the semantic features actually determined, which will be discussed in detail in the example below. Since the feature information of each text item subset is indicated by semantic features, the importance of the text item subset may also be considered as the importance of the semantic features. The importance of the corresponding text item subset may enable more attention to the associated semantic features when comment values are determined, which helps to improve the accuracy of comment evaluation results. Such a mechanism may also be referred to as an "attention" mechanism.

As an example, it is assumed that $e^p$ is an initial code of description of a commodity P, and $e^r$ is an initial code of a comment R on the commodity. The initial comment code $e^p$ and the initial release code $e^r$ are respectively coded by a bidirectional LSTM (Long and short-term Memory) with l hidden layer units, that is, Bi-LSTM, and codes of the description and the comment R of the commodity P in a Bi-LSTM state are obtained as:

$$H^p=\text{BiLSTM}(e^p), H^r=\text{BiLSTM}(e^r)$$

Where $H^p \in R^{l \times p}$ and $H^r \in R^{l \times r}$ represent codes of the description and the comment R of the commodity P in the Bi-LSTM state respectively, that is, a comment code and a release code.

The method for calculating an attention weight matrix G from the description of the commodity P to the comment R of the commodity is as follows:

$$G=\text{SoftMax}(\text{Relu}(W^g H^p + b^g \otimes i^p)^T H^r)$$

Where $W^g \in R^{l \times l}$ and $b^g \in R^l$ are learnable parameters. ($\cdot \otimes i^p$) represents repetition of a column vector $b^p$ by p times to form a l×l matrix. The $i^{th}$ column of $G \in R^{p \times r}$ represents standard attention weights of the i word of the comment r in all words of the description of the commodity P.

Next, the code of the description of the commodity in the Bi-LSTM state is mapped to a vector of a code of a certain comment in the Bi-LSTM state by the following calculation:

$$\overline{H}^r = H^{r}G$$

$\overline{H}^r$ calculated is output and then added with $H^r$, i.e., $\overline{H}^r + H^r$. The added matrix is then used as an attention mechanism code x which is respectively input into two tasks of determining whether the comment is valuable and predicting a score of the comment. Alternatively, the added matrix may also be stretched into a column vector x, as an attention mechanism code x of the comment. x is respectively input into two tasks of determining whether the comment is valuable and predicting a score of the comment.

The significance of adding $\overline{H}^r$ with $H^r$ as the last input is: First, when network parameters are updated using a back-propagation method in the neural network learning process, if $\overline{H}^r$ is 0, only the Bi-LSTM parameter related to the calculation of $H^r$ needs to be updated, and the G parameter related to the calculation of $\overline{H}^r$ does not need to be updated, thereby realizing jump update, and improving the learning efficiency of the network. Second, when $\overline{H}^r$ is added with $H^r$ as the input, more comments and information related to the commodity itself are learnt, which may not only extract the features of the comments themselves, but also may extract the features related to the commodity in the comments, thereby complying with the goal of evaluating the quality of web comments in some embodiments of the present disclosure.

The first task of determining whether the comment is valuable is a binary classification task, which identifies the true usefulness y of the comment by using a logistic regression model:

$$\hat{y} = \frac{1}{1 + \exp-(w_1^T x + b_1)}$$

$\hat{y}$ is a predicted probability of usefulness of the comment, $w_1$ and $b_1$ are respectively a parameter and an offset of the logistic regression model. For trained data of N samples, a series of usefulness probabilities $(\hat{y}_1, \hat{y}_2, \ldots, \hat{y}_N)$ of the comment are correspondingly predicted, and compared with the true usefulness of the comment, the total loss is:

$$L_y = \sum_{i=1}^{N} -(y_i \log(\hat{y}_i) - (1 - y_i)\log(1 - \hat{y}_i))$$

The second task is to predict a score of the comment. Considering that Internet comments are scored as continuous real values in most cases, the true score z is predicted using a linear regression model:

$$\hat{z} = w_2^T x + b_2$$

Where $\hat{z}$ is a predicted score; $w_2$ and $b_2$ are respectively a parameter and an offset of the linear regression model. For trained data of N samples, a series of scores $(\hat{z}_1, \hat{z}_2, \ldots, \hat{z}_N)$ are predicted, and compared with the true user score, where the loss of this prediction process is $L_z$.

$$L_z = \sum_{i=1}^{N} (\hat{z} - z_i)^2$$

Through the above method, a usefulness probability set and a predicted comment score set may be obtained.

Step 405: presenting, based on the obtained usefulness probability set and predicted comment score set, the comment information in the comment information set.

Steps 401 and 405 may be performed similar to steps 201 and 204 of the embodiment shown in FIG. 2, and repeated details thereof are not described herein again.

It can be seen from FIG. 4 that, compared with the corresponding embodiment of FIG. 2, the flow 400 of the method for presenting information in the present embodiment embodies the step of extracting word vector codes and character vector codes. Not only may the features of the comments themselves be extracted, but also the features related to the release information in the comments may be extracted, which is in more accordance with the goal of evaluating the quality of comments in some embodiments of the present disclosure. Therefore, the solution described in the present embodiments may present, to the user, information in more accordance with the user's needs, and helps to improve the user experience.

Figure 5:
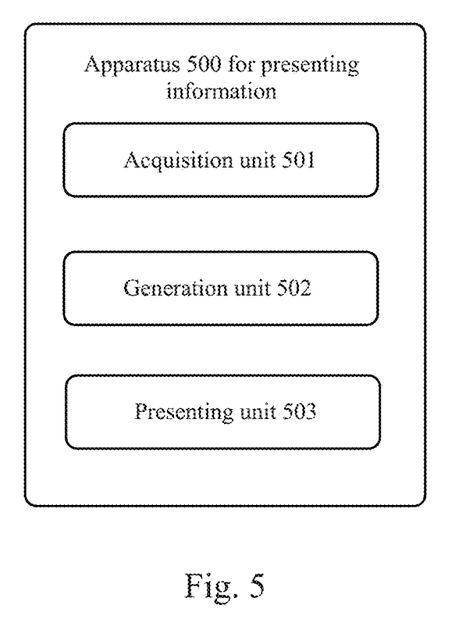
FIG. 5 is a schematic structural diagram of an apparatus for presenting information according to an embodiment of the present disclosure.

With further reference to FIG. 5, as an implementation of the method shown in the above figures, an embodiment of the present disclosure provides an apparatus for presenting information. The embodiment of the apparatus corresponds to the embodiment of the method shown in FIG. 2, and the apparatus may be applied to various servers.

As shown in FIG. 5, the apparatus 500 for presenting information according to the present embodiment includes: an acquisition unit 501, configured to acquire target release information and a comment information set associated with the target release information; a generation unit 502, configured to generate, for comment information in the comment information set, usefulness probabilities and predicted comment scores of the comment information based on the comment information and the target release information; and a presenting unit 503, configured to present, based on obtained usefulness probability set and predicted comment score set, the comment information in the comment information set.

In some alternative implementations of the present embodiment, the presenting unit is further configured to present the comment information in the comment information set in a descending order of corresponding predicted comment scores.

In some alternative implementations of the present embodiment, the presenting unit is further configured to display the comment information corresponding to usefulness probabilities smaller than a preset threshold by hiding or folding.

In some alternative implementations of the present embodiment, the generation unit includes: a first generation subunit, configured to extract word vector codes and character vector codes from the comment information, and generate initial comment codes based on the word vector codes extracted from the comment information and the character vector codes extracted from the comment information; a second generation subunit, configured to extract word vector codes and character vector codes from the target release information, and generate initial release codes based on the word vector codes extracted from the target release information and the character vector codes extracted from the target release information; and a third generation subunit, configured to generate usefulness probabilities and predicted comment scores based on the initial comment codes and the initial release codes.

In some alternative implementations of the present embodiment, the third generation subunit includes: a first input module, configured to input the initial comment codes into a first bidirectional long and short-term memory recurrent neural network to obtain comment codes; a second input module, configured to input the initial release codes into a second bidirectional long and short-term memory recurrent neural network to obtain release codes; a conversion module, configured to convert the release codes by an attention weight matrix to obtain release mapping codes; a generation module, configured to generate attention mechanism codes based on the release mapping codes and the comment codes; a third input module, configured to input the attention mechanism codes into a logistic regression model to obtain usefulness probabilities; and a fourth input module, configured to input the attention mechanism codes into a linear regression model to obtain predicted comment scores.

According to the apparatus provided by the above embodiment of the present disclosure, an acquisition unit 501 acquires target release information and a comment information set associated with the target release information. Then, a generation unit 502 generates, for comment information in the comment information set, usefulness probabilities and predicted comment scores of the comment information based on the comment information and the target release information. Later, a presenting unit 503 presents, based on the obtained usefulness probability set and predicted comment score set, the comment information in the comment information set. With the apparatus of the present embodiment, valid text features may be automatically learnt without additional development or purchase of linguistic feature extraction tools (e.g., Chinese word segmentation, habit annotation, syntactic analysis tools). The text information such as release information and comment information thereof may be used as original input of the apparatus, and the output is the predicted result of whether the comment information is valuable. With the apparatus of the present embodiment, the comment information having high quality and related to the target release information may be obtained by extracting features from the release information and the comment information, so that the comment information having high quality and related to the target release information may be presented to meet user needs and improve user experience.

Figure 6:
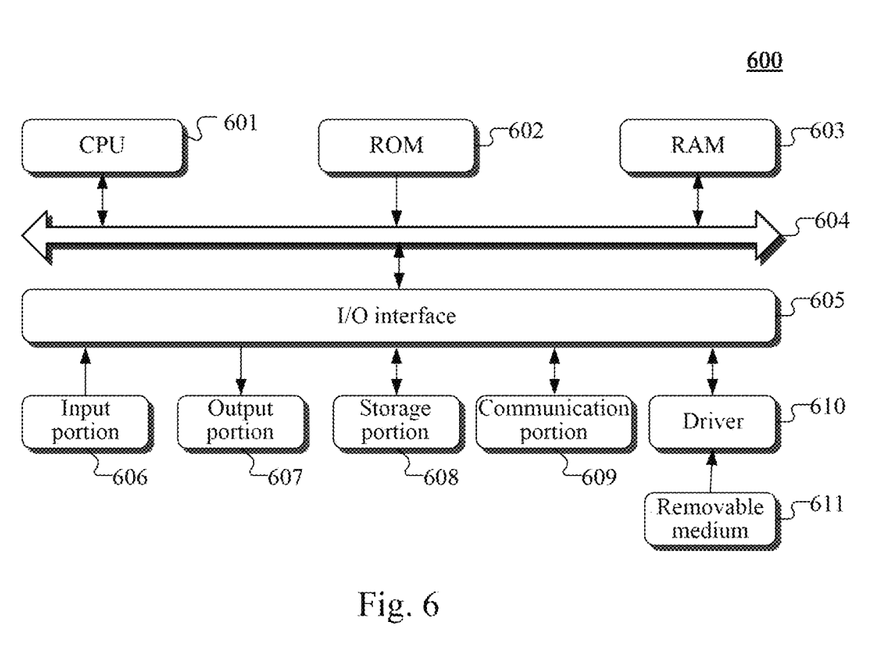
FIG. 6 is a schematic structural diagram of a computer system adapted to implement an electronic device of embodiments of the present disclosure.

Referring to FIG. 6, a schematic structural diagram of a computer system 600 adapted to implement a server of some embodiments of the present disclosure is shown. The computer system shown in FIG. 6 is merely an example, and should not limit the function and scope of use of the embodiments of the present disclosure.

As shown in FIG. 6, the computer system 600 includes a central processing unit (CPU) 601, which may execute various appropriate operations and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602, and the RAM 603 are connected to each other through a bus 604. An input/output (I/O) interface 605 is also connected to the bus 604.

The following components are connected to the I/O interface 605: an input portion 606 including a keyboard, a mouse, or the like; an output portion 607 including a cathode ray tube (CRT), a liquid crystal display (LCD), a speaker, or the like; a storage portion 608 including a hard disk or the like; and a communication portion 609 including a network interface card, such as an LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610 as required, so that a computer program read therefrom is installed on the storage portion 608 as required.

In particular, according to some embodiments of the present disclosure, the process described above with reference to the flowchart may be implemented in a computer software program. For example, an embodiment of the present disclosure provides a computer program product including a computer program loaded to a computer readable medium, the computer program including a program code for executing the method shown in the flowchart. In such an embodiment, the computer program may be downloaded and installed from a network via the communication portion 609, and/or installed from the removable medium 611. The computer program, when executed by the CPU 601, implements the functions as defined by the methods of the present disclosure. It should be noted that the computer readable medium in the present disclosure may be a computer readable signal medium or a computer readable storage medium or any combination of the above two. An example of the computer readable storage medium may include, but is not limited to: electric, magnetic, optical, electromagnetic, infrared, or semiconductor systems, apparatus, elements, or any combination of the above. A more specific example of the computer readable storage medium may include but is not limited to: an electrical connection with one or more wires, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory, or any suitable combination of the above. In the present disclosure, the computer readable storage medium may be any tangible medium containing or storing programs which may be used by an instruction execution system, apparatus or device or incorporated thereto. In the present disclosure, the computer readable signal medium may include a data signal in the base band or propagated as part of a carrier, in which computer readable program codes are carried. The propagated data signal may be in various forms, including but not limited to: an electromagnetic signal, an optical signal or any suitable combination of the above. The computer readable signal medium may also be any computer readable medium beyond the computer readable storage medium. The computer readable medium is capable of sending, propagating or transmitting a program used by an instruction execution system, apparatus or device or a combination of them. The program codes included in the computer readable medium may be transmitted by any appropriate medium, including but not limited to wireless, wired, optical cable, RF, etc., or any appropriate combination of them.

The flowcharts and block diagrams in the drawings illustrate system architectures, functions and operations that may be implemented according to the systems, methods and computer program products of various embodiments of the present disclosure. In this regard, each box in the flowcharts or block diagrams may represent a module, a program segment, or a part of a code, which includes one or more executable instructions for implementing the specified logical functions. It should be noted that, in some alternative implementations, the functions marked in the boxes may also be implemented in an order different from that marked in the drawing. For example, two consecutive boxes substantially may be executed in parallel, or sometimes executed in a reverse order, depending on the involved functions. It should also be noted that, each box in the block diagrams and/or flowcharts, and a combination of boxes in the block diagrams and/or flowcharts may be implemented by a dedicated hardware-based system for executing specified functions or operations, or implemented by a combination of dedicated hardware and computer instructions.

The units described in embodiments of the present disclosure may be implemented by software or hardware. The units described may also be set in a processor, for example, described as a processor includes an information acquisition unit, a generation unit, and a presenting unit. The names of these units do not constitute limitations to such units themselves in some cases. For example, the information acquisition unit may also be described as "a unit for acquiring target release information and a comment information set associated with the target release information".

As another aspect, embodiments of the present disclosure further provides a computer readable medium, which may be included in the apparatus described in the above embodiment, or exists alone and is not assembled into the apparatus. The computer readable medium stores one or more programs. The one or more programs, when executed by the apparatus, cause the apparatus to: acquire target release information and a comment information set associated with the target release information; generate, for comment information in the comment information set, usefulness probabilities and predicted comment scores of the comment information based on the comment information and the target release information; and present, based on the obtained usefulness probability set and predicted comment score set, the comment information in the comment information set.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical solutions formed by the above-described features being interchanged with, but not limited to, technical features with similar functions disclosed in the present disclosure are examples.

What is claimed is:

1. A method for presenting information, comprising:
   acquiring target release information and a comment information set associated with the target release information;
   generating, for comment information in the comment information set, usefulness probabilities and predicted comment scores of the comment information based on the comment information and the target release information; and
   presenting, based on obtained usefulness probability set and predicted comment score set, the comment information in the comment information set,
   wherein the generating usefulness probabilities and predicted comment scores of the comment information based on the comment information and the target release information comprises:
   extracting word vector codes and character vector codes from the comment information, and generating initial comment codes based on the extracted word vector codes and the character vector codes;
   extracting word vector codes and character vector codes from the target release information, and generating initial release codes based on the extracted word vector codes and the character vector codes;
   inputting the initial comment codes into a first bidirectional long and short-term memory recurrent neural network to obtain comment codes;
   inputting the initial release codes into a second bidirectional long and short-term memory recurrent neural network to obtain release codes;
   generating attention mechanism codes based on the release codes and the comment codes;
   inputting the attention mechanism codes into a logistic regression model to obtain the usefulness probabilities; and
   inputting the attention mechanism codes into a linear regression model to obtain the predicted comment scores.

2. The method according to claim 1, wherein the presenting, based on the obtained usefulness probability set and predicted comment score set, the comment information in the comment information set comprises:
   presenting the comment information in the comment information set in a descending order of corresponding predicted comment scores.

3. The method according to claim 1, wherein the presenting, based on the obtained usefulness probability set and predicted comment score set, the comment information in the comment information set comprises:
   hiding or folding the comment information corresponding to usefulness probabilities smaller than a preset threshold.

4. An apparatus for presenting information, comprising:
   at least one processor; and
   a memory storing instructions, wherein the instructions when executed by the at least one processor, cause the at least one processor to perform operations, the operations comprising:
   acquiring target release information and a comment information set associated with the target release information;
   generating, for comment information in the comment information set, usefulness probabilities and predicted comment scores of the comment information based on the comment information and the target release information; and
   presenting, based on obtained usefulness probability set and predicted comment score set, the comment information in the comment information set,
   wherein the generating usefulness probabilities and predicted comment scores of the comment information based on the comment information and the target release information comprises:
   extracting word vector codes and character vector codes from the comment information, and generating initial comment codes based on the extracted word vector codes and the character vector codes;
   extracting word vector codes and character vector codes from the target release information, and generating initial release codes based on the extracted word vector codes and the character vector codes;
   inputting the initial comment codes into a first bidirectional long and short-term memory recurrent neural network to obtain comment codes;

inputting the initial release codes into a second bidirectional long and short-term memory recurrent neural network to obtain release codes; generating attention mechanism codes based on the release codes and the comment codes;

inputting the attention mechanism codes into a logistic regression model to obtain the usefulness probabilities; and inputting the attention mechanism codes into a linear regression model to obtain the predicted comment scores.

5. The apparatus according to claim 4, wherein the presenting, based on the obtained usefulness probability set and predicted comment score set, the comment information in the comment information set comprises:

presenting the comment information in the comment information set in a descending order of corresponding predicted comment scores.

6. The apparatus according to claim 4, wherein the presenting, based on the obtained usefulness probability set and predicted comment score set, the comment information in the comment information set comprises:

hiding of folding the comment information corresponding to usefulness probabilities smaller than a preset threshold.

7. A non-transitory computer readable storage medium storing a computer program, wherein the computer program, when executed by a processor, causes the processor to perform operations, the operations comprising:

acquiring target release information and a comment information set associated with the target release information;

generating, for comment information in the comment information set, usefulness probabilities and predicted comment scores of the comment information based on the comment information and the target release information; and presenting, based on obtained usefulness probability set and predicted comment score set, the comment information in the comment information set, wherein the generating usefulness probabilities and predicted comment scores of the comment information based on the comment information and the target release information comprises:

extracting word vector codes and character vector codes from the comment information, and generating initial comment codes based on the extracted word vector codes and the character vector codes;

extracting word vector codes and character vector codes from the target release information, and generating initial release codes based on the extracted word vector codes and the character vector codes;

inputting the initial comment codes into a first bidirectional long and short-term memory recurrent neural network to obtain comment codes;

inputting the initial release codes into a second bidirectional long and short-term memory recurrent neural network to obtain release codes;

generating attention mechanism codes based on the release codes and the comment codes;

inputting the attention mechanism codes into a logistic regression model to obtain the usefulness probabilities; and inputting the attention mechanism codes into a linear regression model to obtain the predicted comment scores.

8. The non-transitory computer readable storage medium according to claim 7, wherein the presenting, based on the obtained usefulness probability set and predicted comment score set, the comment information in the comment information set comprises:

presenting the comment information in the comment information set in a descending order of corresponding predicted comment scores.

9. The non-transitory computer readable storage medium according to claim 7, wherein the presenting, based on the obtained usefulness probability set and predicted comment score set, the comment information in the comment information set comprises:

hiding or folding the comment information corresponding to usefulness probabilities smaller than a preset threshold by hiding or folding.

\* \* \* \* \*